United States Patent Office 3,594,458
Patented July 20, 1971

3,594,458
METHOD OF PRODUCING POLYVINYL
FLUORIDE WEBS
George N. Foster, Somerville, and William Sacks, Gillette,
N.J., assignors to Union Carbide Corporation
No Drawing. Filed Nov. 24, 1967, Ser. No. 685,336
Int. Cl. B29c 25/00; B29d 7/24
U.S. Cl. 264—22                                    6 Claims

ABSTRACT OF THE DISCLOSURE

Vinyl fluoride polymer webs including film, in the absence of solvent can upon irradiation and heating to orientation temperature, be readily biaxially oriented, in tubular or nontubular form, to a clear, durable web.

FIELD OF THE INVENTION

This invention relates to vinyl fluoride polymer webs and particularly to orienting vinyl fluoride polymer webs.

THE PRIOR ART

Heretofore vinyl fluoride polymer webs have been known to be difficult to orient, particularly webs containing 50% or more by weight of vinyl fluoride polymer. Orienting even high molecular weight vinyl fluoride polymer webs, particularly film, has met with considerable difficulty including breaks, tears and uneven stretching, as noted, for example, in British Pat. 936,398.

Attempts to biaxially orient high molecular weight, orientable vinyl fluoride polymer films by any of the conventional drawing techniques, including the blown bubble technique, have met with difficulties. For example, at relatively low temperatures, e.g. below 100° C., orientable vinyl fluoride polymer film is found to exhibit the phenomenon of line drawing, i.e., thickness reduction, instead of occurring uniformly over the entire distance between the lines of stress application, takes place over a relatively short distance along a line running across the film width perpendicular to the direction in which the stress is applied. With line drawing, control of thickness uniformity is extremely difficult, if not practically impossible.

In addition to line drawing, orientable vinyl fluoride polymer film, on being elongated in one direction, shows a marked tendency to fibrillate along lines parallel to the direction of this initial elongation when subjected to tension in a direction substantially at right angles thereto. Although the tendency to line draw can be minimized by operating at higher temperatures, the tendency to fibrillate increases rapidly as operating temperatures increase above 100° C. and stretching becomes more uniform.

Attempts have been made to improve the orientability of vinyl fluoride polymer films by adding high (usually 35 to 70 weight percent) weight proportions of latent solvent (a material which only serves as a solvent at elevated temperatures and separates from the solute as it is cooled) to the films during its formation and thereafter biorienting the solvent-containing web on a tenter-frame. The difficulties with this method include the requirement of great quantities of expensive solvents in the process and the added step of driving off or removing the solvent, during or after the biorientation step so as to obtain dry, solvent-free film. Driving off the solvent brings such problems as handling the solvent vapors so as to preserve suitable working conditions and solvent recovery. A further difficulty is that orienting tubular web by the above latent solvent technique is practically ruled out because the solvent vapors become trapped in the tube repressing solvent removal; this is particularly true in the captive bubble process where released vapor within the tube is not only trapped but increases the pressure within the tube causing undesirable expansion thereof. Moreover the above latent solvent extrusion tenter stretch process requires a polyvinyl fluoride of a high molecular weight characterized by a reduced solution viscosity greater than 1 and preferably between 3 and 4 deciliters/gram (dl./g.) in cyclohexanone at 140° C. so as to permit continuous biorientation.

Thus a process which renders webs, containing at least 50% by weight vinyl fluoride polymer, readily orientable, whether in tubular or nontubular form, has heretofore not been available.

Accordingly, there has now been discovered a method for rendering vinyl fluoride polymer webs, including tubular films, readily orientable. A highly bioriented polyvinyl web is provided and a solvent-free method for orienting such web.

SUMMARY

Broadly the process of the present invention for producing bioriented vinyl fluoride polymer web containing at least 50% by weight vinyl fluoride polymerized therein comprises irradiating the web to a total dosage of 0.5 to 100 megareps and thereafter heating the web to a temperature in the range of 60° C. below the melting point of the web composition to about 10° C. thereabove and biorienting the web at such temperature.

DESCRIPTION

Thus, by the method of the invention, formerly difficult to orient vinyl fluoride polymer webs, upon suitable irradiation undergo considerable crosslinking and can be easily bioriented to form a strong uniform tubular or nontubular web including film. Web, in tubular form, is typically extruded as a tube up to 35 mils thick or more, cooled by a fluid such as air or water, to a set temperature therefor, irradiated, heated to an orientation temperature therefor and then biaxially stretched several diameters to a clear tubular web or a clear glossy film as thin as 1 mil or less.

As indicated above, vinyl fluoride polymer webs undergo extensive cross-linking when irradiated. The extent of the cross-linking undergone is indicated in the following table which gives the resulting insolubilities in cyclohexanol for samples of two different vinyl fluoride polymer compositions which had been irradiated at the various dosages indicated. The data was obtained by irradiating molded sheets of the polymers under a nitrogen blanket. The temperature of irradiation did not exceed 125° C. The insolubility fractions were determined by extracting the irradiated sheets in hot cyclohexanone. The sheets, 10 to 25 mils in thickness, were cut for extraction into ¼ inch by 2 inch samples. The extractions of the 1, 5 and 10 megarep samples were made in a solvent extraction unit with the extracting cyclohexanone solvent near its reflux temperature. The extractions were run for 24 hour periods. The less soluble irradiated samples (greater than 10 megareps) were extracted directly in boiling cyclohexanone for 4 hours. All extracted samples were dried under 2 mm. Hg. vacuum at 80° C. for 24 hours. The insolubility fraction is equivalent to the weight of the sample after the above solubility test divided by the initial weight of the sample times 100.

TABLE I

| Dosage, megareps | Insolubility fraction, percent | |
| --- | --- | --- |
| | Vinyl-fluoride homopolymer | 5.4% ethylene-vinyl-fluoride copolymer |
| 0 | 0 | 0 |
| .5 | 0 | 10 |
| 1 | 0 | 22 |
| 5 | 10 | 67 |
| 10 | 42 | 80 |
| 20 | 80 | 88 |
| 40 | 90 | 94 |
| 60 | 91 | 94 |
| 80 | 92 | 95 |
| 100 | 92.5 | 95 |

By polyvinyl fluoride webs as used herein is meant webs containing at least 50% by weight of vinyl fluoride polymer. Included in the above are webs of vinyl fluoride homopolymer and webs of vinyl fluoride-ethylene copolymer having an ethylene content of from less than 1% to 15% by weight of the composition. Also included are webs containing, in addition to or other than ethylene, polymers such as other alpha olefins including propylene, butene and the like, as well as acrylic acid, alkyl acetals such as ethyl acetal, alkyl acrylates and the like, alkylene acetals such as vinyl acetate and the like. Binders can also be included such as diatomaceous earth as well as pigments such as titanium dioxide, zinc oxide, ferrous oxide and the like.

The polyvinyl fluoride web compositions above, preferably have less than 1.0 dl./g. reduced solution viscosity in cyclohexanone at a concentration of 0.2 g./dl. (at 140° C.) but can have a higher value if desired of 1 to 4 or more within the scope of the invention. The preferred molecular weight level given by reduced solution viscosity is from 0.5 to 0.90 dl./g. prior to irradiation i.e. medium molecular weight. The above webs can be obtained in any manner, principally by extrusion of tubular or nontubular webs.

Although polyvinyl fluoride webs, including film, considerably discolor to green or brown upon irradiation, which would tend to discourage one from looking at irradiated vinyl fluoride polymers for a film-grade resin, it has been found that heating the irradiated web progressively eliminates discoloration as the temperature increases. Heating the web to 150° C. or more, removes virtually all the discoloration and a clear web particularly clear film is obtained.

The irradiation of polyvinyl fluoride webs suitably takes place below 150° C. web temperature, and preferably at room temperature (about 25° C.). However, the irradiation can also be conducted above 150° C. where desired, without departing from the scope of the invention.

The irradiation can be provided by any conventional high energy electron discharge source operating in a suitable atmosphere such as nitrogen. The atmosphere for the irradiation zone is air or preferably nitrogen. However any other atmospheres can be employed where desired such as carbon dioxide, argon and the like, without departing from the scope of the invention.

The web is generally irradiated by passing it a number of times through an irradiation zone in proportion to the intensity of the irradiation therein to achieve the desired dosage. As indicated above the radiation dosage of the polyvinyl fluoride webs employed can range from 0.5 to 100 megareps. Preferably, however, the webs are irradiated with dosages from 5 to 20 megareps and where the web consists essentially of vinyl fluoride homopolymer, the dosage is preferably at least 10 megareps.

After irradiation, which generally produces a discolored polyvinyl fluoride web, as previously indicated, the web can be passed directly to orientation, particularly biorientation. The web is heated to a suitable orientation temperature in the range of from 60° C. below the melting point of the web composition to about 10° C. above and then stretched in one or more directions. The preferred biaxial orientation temperature range is from 20° C. below the melting point to 10° C. above. The fact that the web composition can be oriented a few degrees above its melting point is another indication of cross-linked material. Heating the web to a suitable orientation temperature, which is usually above 150° C., serves also to clear the discoloration due to irradiation from the web as previously discussed. The clear webs are then stretched to oriented webs, including clear transparent films.

During orientation, the vinyl fluoride polymer webs can be stretched by various means. Nontubular web can be stretched on a tenter-frame or on other known apparatus, such as divergent belts. Tubular web is stretched by passage over conventional mandrels such as a captive fluid medium, for example, air, rigid mandrels, usually made of metal or a combination thereof as where a tube is passed over and around a fluid lubricated metal mandrel.

Polyvinyl fluoride webs, including films oriented by the process of the invention, display high weathering resistance, high clarity, high toughness and strength, including tensile strength of from 15,000 to 25,000 p.s.i. or more for oriented film of 0.5 to 4 mils as well as high impact strength, high gloss, clarity and transparency. Line draw and fibrillation are reduced to a minimum and often eliminated. The webs further have high solvent resistance, showing high resistance to aliphatic, aromatic, chlorinated and ketonic solvents even at boiling temperatures. The orientated webs of the invention, including bioriented film, are also excellent oil and grease barriers as well as excellent barriers for lemon oil, moisture and oxygen, and are stable over a wide temperature range and exhibit flexibility and toughness even at low temperatures, for example, a high impact strength at −40° C. and below.

The following example is illustrative of this invention but is not intended to serve as any limitation or restriction thereof.

Example I

A stabilized, unirradiated, vinyl fluoride copolymer of 10.2% by weight ethylene and 0.77 reduced solution viscosity in cyclohexanone at a concentration of 0.2 g./dl., was melt extruded at 193° C. into blown film. The unoriented film has a tensile strength of 5230 p.s.i./5045 p.s.i. (MT/TD) and an elongation of 573%/801%. An extruded primary tube, 15 mils in thickness, was irradiated at 10 megareps by passing the tube in proximity with a Van de Graaff Electron Accelerator, model AD with a rating of 2 mev. and 500 watts. The irradiated tube was heated to a temperature near its melting point, about 160° C. and then was easily stretched by inflating the primary tube with air to yield a biaxially oriented 1.0 mil film. The irradiated biaxially oriented fil mhad a tensile strength of 8,050/17,530 p.s.i. (MD/TD) and an elongation of 320%/82%, respectively. The unirradiated polymer could not be successfully biaxially oriented, as described above, either at or below its melting point.

What is claimed is:
1. A method for producing tubular bioriented film containing at least 50% by weight vinyl fluoride polymer comprising extruding a tubular web containing vinyl fluoride polymer, irradiating said web in the absence of a solvent with a dosage of 5 to 20 megareps and thereafter passing said tubular web over and around a mandrel of larger periphery than the inner circumference of the tube while maintaining said web at a temperature in the range of 60° C. below the melting point of the web composition to about 10° C. thereabove to form biaxially oriented film.

2. The method of claim 1 wherein said irradiation occurs while the web is maintained at a temperature below 125° C.

3. The method of claim 1 wherein said mandrel is a captive air mandrel.

4. The method of claim 1 wherein said mandrel is of rigid material.

5. The method of claim 1 wherein said web consists essentially of polyvinyl fluoride.

6. The method of claim 1 wherein said web comprises vinyl fluoride-ethylene copolymer having an ethylene content of up to 15% of the film composition.

References Cited

UNITED STATES PATENTS

| 3,448,182 | 6/1969 | Derbyshire | 264—95 |
| 2,987,767 | 6/1961 | Berry | 264—95 |
| 3,331,901 | 7/1967 | Thomas | 264—209 |
| 3,081,208 | 3/1963 | Bottorf | 264—210 |
| 3,101,306 | 8/1963 | Wippler | 204—159.2 |
| 3,142,629 | 7/1964 | Timmerman | 117—93.31 |

ROBERT F. WHITE, Primary Examiner

R. SHEAR, Assistant Examiner

U.S. Cl. X.R.

204—159.2; 264—85, 95